United States Patent [19]

Ackley

[11] Patent Number: 5,811,781
[45] Date of Patent: Sep. 22, 1998

[54] BAR CODE SYMBOLOGY CAPABLE OF ENCODING 16-BIT CHARACTERS, AND METHOD AND APPARATUS FOR PRINTING AND READING SAME

[75] Inventor: H. Sprague Ackley, Seattle, Wash.

[73] Assignee: Intermec Corporation, Everett, Wash.

[21] Appl. No.: 701,304

[22] Filed: Aug. 21, 1996

Related U.S. Application Data

[63] Continuation-in-part of Ser. No. 295,382, Aug. 24, 1994, Pat. No. 5,557,092, which is a continuation-in-part of Ser. No. 147,376, Nov. 5, 1993, abandoned.

[51] Int. Cl.$^6$ .................................................. G06K 7/10
[52] U.S. Cl. ........................... 235/462; 235/472; 235/494
[58] Field of Search ................................... 235/462, 463, 235/487, 375, 494, 454, 472; 380/28, 51, 55

[56] References Cited

U.S. PATENT DOCUMENTS

| | | | |
|---|---|---|---|
| 4,079,482 | 3/1978 | Yeh .......................................... | 235/487 |
| 4,307,293 | 12/1981 | Lazzarotti et al. ....................... | 235/462 |
| 5,097,263 | 3/1992 | Delpech et al. ......................... | 341/155 |
| 5,128,526 | 7/1992 | Yoshida ................................... | 235/494 |
| 5,204,515 | 4/1993 | Yoshida ................................... | 235/494 |
| 5,298,731 | 3/1994 | Ett ........................................... | 235/494 |
| 5,420,403 | 5/1995 | Allum et al. ............................. | 235/375 |
| 5,557,092 | 9/1996 | Ackley et al. ........................... | 235/462 |

FOREIGN PATENT DOCUMENTS 33 30 261  3/1985  Germany.

OTHER PUBLICATIONS

*Alphanumeric Data Compaction,* Rev. C, Intermec Corporation, Everett, Washington, 1992, 6 pages. no month.

Palmer, Roger C., *The Bar Code Book,* 2d ed., Chapter 4, Helmers Publishing, Inc., New Hampshire, 1991, pp. 15–59. no month.

"Bar Code Compression Decompression," *IBM Technical Disclosure Bulletin,* vol. 32, No. 12, May 1990, pp. 288–290.

*The Unicode Standard Worldwide Character Encoding,* Version 1, vol. 1, The Unicode Consortium, Addison–Wesley Publishing Company, Inc., Massachusetts, 1991, pp. 1–6, and 340. no month.

Walker, Nathan, "ASCII–based compaction eases bar–code decoder's work," *Electronic Design 30*:22, Oct. 1982, pp. 163–166.

*Primary Examiner*—Donald T. Hajec
*Assistant Examiner*—Thien Minh Le
*Attorney, Agent, or Firm*—Seed and Berry LLP

[57] ABSTRACT

The new bar code symbology under the present invention directly encodes one symbol character for each human readable character in known 16-bit data character encoding standards, such as Unicode. The symbology employs six bars and six spaces for each symbol, and has a total width of 21 modules for each symbol character, and thus is a (21,6) symbology. Bars and spaces in symbol characters having greater than six modules in width are eliminated, as are bounding strings of more than six adjacent one-wide elements. As a result, the symbology is wand scannable, readily printable, and can be read when out-of-focus. Parity codes are employed, to enable Hamming distances between symbol characters to be maximized, and thereby improve data security of the symbology (e.g., the total width of all bars in each symbol character is equal to an even number). As a result, the present symbology preferably encodes 80,077 data characters. By employing a prime number of symbol characters, the symbology provides robust error correcting and error detection capabilities. The encoded data characters include not only the Unicode characters, but also compressed three- and four-digit numeric characters, and compressed pairs of alphanumeric characters, each encoded as a single unique symbol character. A set of start characters under the symbology not only indicate the start of a given label but also encode data characters therein.

20 Claims, 7 Drawing Sheets

CODE 128

HAN MA

ENCODED DATA IS THE UCC SSCC-18 ("00000521775138957172")

CODE 128

HAN MA

ENCODED DATA IS "A1234BC5678DE9012"

BAR CODE SYMBOLOGY CAPABLE OF ENCODING 16-BIT CHARACTERS, AND METHOD AND APPARATUS FOR PRINTING AND READING SAME

CROSS REFERENCE TO RELATED APPLICATIONS

This application is a continuation-in-part of application Ser. No. 08/295,382, filed Aug. 24, 1994, now U.S. Pat. No. 5,557,092, which is a continuation-in-part of application Ser. No. 08/147,376, filed Nov. 5, 1993, now abandoned.

TECHNICAL FIELD

This invention relates to a new machine-readable symbology, and devices and methods for reading or printing bar code symbols under the symbology.

BACKGROUND OF THE INVENTION

Bar code symbologies were first disclosed in U.S. Pat. No. 1,985,035 by Kermode and expanded shortly thereafter in the 1930's in U.S. Pat. No. 2,020,925 by Young, assigned to Westinghouse. These early symbologies were printed by generating a multiplicity of single width elements of lower reflectance, or "bars," which were separated by elements of higher reflectance, or "spaces." An "element" is a bar or space. These early symbologies, and many "bar code symbologies" used today can be referred to as "linear symbologies" because data in a given symbol is decoded along one axis or direction. Symbologies such as linear symbologies encode "data characters" (e.g., human readable characters) as "symbol characters," which are generally parallel arrangements of alternating bars and spaces that form unique groups of patterns to encode specific data characters. Data characters include not only human readable characters, but also include special function characters such as start, stop or shift characters that provide certain functional data. Each unique group or pattern of bars and spaces within a predetermined width defines a particular symbol character, and thus a particular data character or characters.

The known U.P.C. symbology was described generically by Savir and Laurer of IBM as a (7,2) "n,k code" in 1974. An "n,k code" is defined as a symbology where each symbol character has an "k" number of bars and spaces and whose total length is "n" modules long. Therefore, the U.P.C. symbology encodes two bars and two spaces in each symbol character and each symbol character is seven modules long. A "module" is the narrowest nominal width unit of measure in a bar code symbology (a one-wide bar or space). "Nominal" refers to the intended value of a specific parameter, regardless of printing errors, etc. Under common counting techniques, the number of possible symbol characters can be found by realizing that in seven modules, there are six locations where a transition can occur, and that for two bars and two spaces, there are three internal transitions. Therefore, the number of unique symbol characters for the U.P.C. symbology is simply 6 choose 3 which equals 20. Similarly, under the Code 128 symbology, which is an (11,3) symbology, 252 unique symbol characters are available (10 choose 5).

The bar code symbologies known as U.P.C., EAN, Code 11 and Codabar are all bar code symbology standards which support only numeric data characters, and a few special characters such as "+" and "−". The U.P.C. symbology is both a bar code standard, as well as an industry standard, in that it has been adopted by industry in a standard application (consumer goods). The bar code standard Code 39 was the first alphanumeric bar code symbology standard developed. However, it was limited to 43 characters.

Code 93 is an improvement over Code 39. Code 93 is a continuous bar code symbology employing four element widths. Each Code 93 symbol has nine modules that may be either black or white (either a bar or a space). Each symbol in the Code 93 standard contains three bars and three spaces (six elements), whose total length is nine modules long. Code 93, having nine modules and three bars per symbol is thus a (9,3) symbology which has 56 possible characters (8 choose 5). For edge to edge decoding reasons, the Code 93 symbology standard defines only 48 unique symbols, and thus is able to define 47 characters in its character set plus a start/stop code. The 47 characters include the numeric characters 0–9, the alphabetic characters A–Z, some additional symbols and four shift codes.

The computer industry uses its own character encoding standards, namely, the American Standard Code for Information Interchange (ASCII). ASCII defines a character set containing 128 characters and symbols. Each character in ASCII is represented by a unique 7-bit code. Since Code 39 and Code 93 are limited to fewer than 50 characters, these standards are inadequate to uniquely represent each ASCII character. The four shift codes in Code 93, however, allow this standard to unambiguously represent all 128 ASCII characters. One drawback is that a series of two Code 93 symbols are required to represent a single ASCII character. Thus, bar code labels representing characters in the ASCII character set are twice as long as labels representing characters in the Code 93 character set.

New bar code symbology standards, such as Code 128, were developed to encode the complete ASCII character set, however, these standards suffer from certain shortcomings, including requiring shift codes or other preceding symbols to represent certain characters. All of these symbologies require increased processing time and overhead to process the entire ASCII character set.

The computer industry has grown beyond the limits of the ASCII character set. As the computer markets have grown, the need to support additional languages not defined by the ASCII character set has also arisen. New character sets were developed to accommodate clusters of characters in related languages. The original 7-bit ASCII character set was expanded to 8 bits thus providing an additional 128 characters or data values. This additional 128 set of data values (the "upper 128") allowed for additional characters present in the related romance languages (i.e., French, German, Spanish, etc.) to be represented.

As the computer markets grew internationally, however, even more languages were required to be included in the character set. Particularly, the Asian markets demanded a character set, usable on computers, which supported thousands of unique characters. To uniquely define each of these characters, a 16-bit encoding standard was required.

Several 16-bit encoding standards such as Unicode, JISC-6226-1983, and others have recently been developed. The Unicode character encoding standard is a fixed-length, uniform text and character encoding standard. The Unicode standard may contain up to 65,536 characters, and currently contains over 28,000 characters mapping onto the world's scripts, including Greek, Hebrew, Latin, Japanese, Chinese, Korean, and Taiwanese. The Unicode standard is modeled on the ASCII character set. Unicode character values are consistently 16 bits long, regardless of language, so no escape sequence or control code is required to specify any character in any language. Unicode character encoding treats symbols, alphabetic characters, and ideographic characters identically, so that they can be used in various computer applications simultaneously and with equal facility. Computer programs using Unicode character encoding to represent characters, but which do not display or print text, can remain unaltered when new scripts or characters are introduced.

New computer operating systems are beginning to support these comprehensive 16-bit code standards, e.g., WINDOWS NT, manufactured by Microsoft Corporation of Redmond, Wash. The data collection industry, however, has failed to keep pace with the computer industry. No system currently exists for readily encoding the 16-bit computer character codes into bar code symbols. Therefore, there is a need to support these 16-bit computer character standards in the data collection industry, particularly for bar code symbologies.

Furthermore, most alphanumeric bar code symbologies are inefficient when used to encode a long series of numbers. When encoding a series of decimal numbers using Code 93 for example, the 26 bar code symbols reflecting the 26 alphabetic characters are not used. Therefore, there is a need to allow these alphanumeric bar code symbologies to more efficiently represent a long series of numbers.

As is known, data characters encoded under nearly all symbologies can result in errors when decoded by a laser scanner or other bar code reader. To reduce errors, certain symbologies include check characters. A "check character" is a symbol character included within a given bar code symbol (usually at the end of the symbol characters, although placement is not important to its function) whose value is used to perform a mathematical check that determines whether the symbol has been decoded correctly.

For example, the known Code 39 symbology has an optional modulo 43 check character that can be included as the last symbol character in a symbol. The Code 39 check character is calculated by determining a character value for each data character in an original message, adding together all of the character values, and dividing the sum by 43. The check character becomes the remainder that results from such division, and is appended to the end of a label encoded from the message. A "character value" or "symbol code" is a number representing a data character in a given symbology. For example, in the Code 39 symbology, the data character "A" has a character value of "10".

The Code 39 symbology employs 43 symbol characters, which is a prime number of symbol characters. Therefore, using modulo 43 mathematics to generate a check character, a unique check character for any given series of data characters will always result. The U.P.C. symbology, however, employs a modulo 10 check character. Since 10 is a non-prime number having factors of 1, 2 and 5, and therefore a modulo 10 checking detects fewer errors. As a result, the U.P.C. symbology application environment employs a data base having a look-up table to compensate for such a shortcoming of the checking scheme.

Other symbologies improve upon the use of check characters, by employing error correction characters. Error correction characters, as with check characters, are calculated mathematically from the other symbol characters in a symbol or label. Error correction characters are symbol characters in a label that are reserved for erasure correction, error correction, and/or error detection. An erasure is a missing, unscanned, or undecodable symbol character; the symbol character's position is known, but not its value. An erasure can result from portions of a symbol having insufficient contrasts, a symbol that falls outside of a reader's field of view, or a portion of which is obliterated. An error is a mis-decoded or mis-located symbol character; both the position and the value of the symbol character are unknown. An error can result from random spots or voids in a symbol when this symbol is printed.

For an error, the error correction characters allow a reader to use these characters in a symbol to locate and correct errors that have unknown values and locations. Two error correction characters are required to correct each error; one error correction character to locate the erroneous symbol character, and the second error correction character to determine what value the erroneous symbol character should have been. For an erasure, the error correction characters allow a reader to use these characters to correct erroneous or missing symbol characters that have known locations. Consequently, only one error correction character is required for each erasure.

Some symbologies, such as Code One and PDF417, have many error correction characters. The Code One symbology, for example, is specifically designed with 27%–50% of the symbol characters allocated to error correction. Consequently, the Code One symbology allows for very secure decoding that mathematically is many orders-of-magnitude more accurate than other symbologies that simply use check characters. However, such error correction characters necessarily require additional area in a label, and therefore reduce the information-density of the label. Additionally, the Code One and PDF417 symbologies are areaor stacked symbologies. As a result, they require a more sophisticated, and thus expensive, reader to decode them.

Typical bar code scanners read bar codes by producing different analog waveforms from bar codes having variable width bars and spaces. When the scanner fails to fully resolve the smallest, one-wide elements, only the wider elements (i.e., two-wide or larger width elements) become resolved. A bar or space is "resolved" if the scanner is able to identify a peak or valley in the wave form that corresponds to the given bar or space. Overall, there is a need to provide a symbology that overcomes all of the shortcomings of known symbologies, is capable of being decoded when unresolved or out-of-focus, and is highly secure.

SUMMARY OF THE INVENTION

Under the above-referenced parent patent, three Code 93 bar code symbols are necessary to uniquely represent each character in a 16-bit character encoding standard. Since the Code 93 standard is a continuous symbology and employs nine modules per character, a total of 27 modules are necessary to encode one 16-bit code. Consequently, the Code 93 standard permits high bar code density, i.e., a large number of data characters represented in a linear unit of measure. The Code 93 standard is currently used and recognized; therefore, applications for its use exist, facilitating wide data exchange throughout the industry. Additionally, the Code 93 standard provides for high data security (i.e., error correction).

Under this U.S. Patent, a string of characters are selected, input or determined, for example, such as by input using a keyboard. The string of characters may also be input to a CPU from a host computer. When a key is depressed on the keyboard, the keystroke is converted into a "scan code" which is transmitted from the keyboard to the device to which the keyboard is connected. This scan code represents the particular key on the keyboard which has been depressed, and is unrelated to any particular character or code in a character set, such as ASCII or Unicode.

The unique 16-bit code for the first character is determined or retrieved. The CPU, for example, translates the scan code input from the keyboard into the unique 16-bit code for the particular character selected by the key depression. In 16-bit character encoding standards, the 16-bit codes are often represented as hexadecimal numbers. For computational purposes, these hexadecimal numbers can be converted to their decimal equivalents. The CPU retrieves the 16-bit code from a memory. In the preferred embodiment, the memory contains the 16-bit codes for all characters in the 16-bit character encoding standard.

Each character may also be input to the CPU over an input line in its corresponding 16-bit code. If the 16-bit code for a character is input to the CPU over the line, the CPU need not access any memory to determine the unique 16-bit code for the character.

The 16-bit code representing a character is converted into three symbol values, i.e., each 16-bit code in the Unicode encoding standard is represented by three Code 93 symbol values. By using three Code 93 symbol values, up to 79,507 unique characters may be represented using the following equation:

$$43^2(X)+43(Y)+(Z)=[16\text{-bit code in decimal}] \quad (1)$$

where the variables X, Y, and Z are numeric values between 0 and 42. Since the above equation may represent more than 79,000 unique characters, this equation will more than adequately represent the over 28,000 characters in the Unicode standard.

The CPU solves equation (1) using known methods. In other words, the CPU computes three numeric values between 0 and 42 for the variables X, Y, and Z in the above equation so as to represent the decimal equivalent of the 16-bit code.

The CPU thereafter encodes each numeric value of the variables X, Y, and Z into a corresponding one of the Code 93 bar code codes or symbol values. In Code 93, the symbol values 0 through 42 represent the characters 0–9, A–Z, "-", ".", "space", "$", "/", "+", and "%", respectively. Symbol values 43 through 47 represent the four shift codes and the stop code.

The CPU then retrieves the counts for printing the bar code symbols representing each of the three Code 93 symbol values. The counts for Code 93 start and stop codes are also retrieved. Since the Code 93 standard is used, the memory or the secondary storage needs to store only the 48 Code 93 symbol values and corresponding counts. Most applications or apparatus using the Code 93 standard have these codes and counts readily available.

In the preferred embodiment, the three Code 93 bar code symbols representing a 16-bit code are also printed with the human-readable character represented by the 16-bit code. Therefore, the CPU retrieves the character font data necessary for printing the characters. The font data provides a printer with particular data necessary to print the unique character represented by the three Code 93 bar code symbols. With a dot matrix-type printer (not shown), the font data instructs the printer how to print the unique character. The font data is stored in either the memory or the secondary storage.

The CPU determines whether all characters in the string initially selected have been converted. If additional characters remain in the string, then the unique 16-bit code for the next character is found, the three numeric values of variables X, Y, and Z are computed, the three numeric values are encoded into three Code 93 symbol values, and the particular font and bar code symbol counts are retrieved. This process is repeated until all of the characters have been converted. Thereafter, the bar code is printed by the printer with both the three Code 93 bar code symbols, and the associated human-readable characters.

The present invention solves the above problems and provides additional benefits by encoding characters represented by 16-bit encoding standards into a new 16-bit symbology. A method is described for decoding bar code symbols representing 16-bit characters into human readable characters, and vice versa. The present invention allows international characters to be encoded and printed onto bar code labels, which may later be read by bar code readers.

The new bar code symbology under the present invention directly encodes one symbol character for each human readable character in known 16-bit data character encoding standards, such as Unicode. The symbology employs six bars and six spaces for each symbol, and has a total width of 21 modules for each symbol character, and thus is a (21,6) symbology. Bars and spaces in symbol characters having greater than six modules in width are eliminated, as are strings of more than six adjacent one-wide elements. As a result, the symbology is wand scannable, readily printable, and can be read when out-of-focus. Parity codes are employed, to enable Hamming distances between symbol characters to be maximized, and thereby improve data security of the symbology (e.g., the total width of all bars in each symbol character is equal to an even number). As a result, the present symbology preferably encodes 80,077 data characters. By employing a prime number of symbol characters, the symbology provides robust error correcting and error detection capabilities. The encoded data characters include not only the Unicode characters, but also compressed three- and four-digit numeric characters, and compressed pairs of alphanumeric characters, each encoded as a single unique symbol character. A set of start characters under the symbology not only indicate the start of a given label but also encode data characters therein and may be used to change or latch to different character sets.

The present invention encodes characters represented by a 16-bit encoding standard into a unique bar code symbology created to uniquely represent each 16-bit code by a bar code symbol. An encoding method includes the steps of: determining a character code having at least 16 bits for a selected character, converting the character code to a bar code, and printing a bar code symbol corresponding to the bar code code. The step of converting the 16-bit character code to a bar code code includes the step of producing the bar code code from either a look-up table or generating it via an algorithm. The converse method is performed for reading a bar code symbol printed by the above method.

Other features and associated advantages of the present invention will become apparent from studying the following detailed description together with the accompanying drawings.

DETAILED DESCRIPTION OF THE INVENTION

Figure 1:
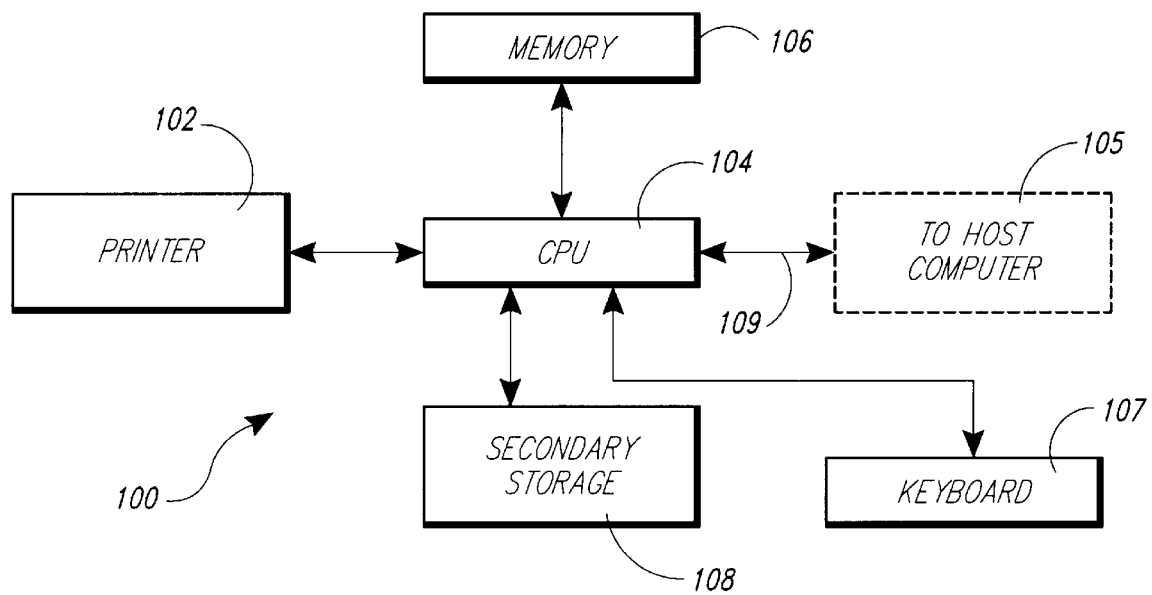
FIG. 1 is a block diagram of a bar code symbol printing apparatus of the present invention.

As used generally herein, the following definitions apply: "data characters" refers to human readable characters, including symbols, numeric characters, alphabetic characters, and ideographic characters; as well as non-readable data, such as function codes, shift codes, etc. "numeric string" refers to a sequence of numeric characters, typically decimal digits; "16-bit code" or "16-bit character code" refers to a hexadecimal or decimal representation of a character in a 16-bit character encoding standard, such as Unicode; "bar code symbology" refers to a set of machine-readable or symbol characters for uniquely representing a set of data characters; "bar code standard" refers to a bar code symbology recognized by, or regularly used in, data collection applications (e.g., Code 128); "symbol code" refers to a code such as an ordinal number representing a data character in a bar code symbology; "symbol character" refers to the unique geometric shapes or bar and space patterns used in a bar code symbology to represent particular data characters; and, "counts" refers to a unique set of electrical signals produced when reading a symbol character corresponding to a data character in a bar code symbology.

For example, in the 16-bit character encoding standard Unicode, the data character "A" is represented by the 16-bit code "0041" in hexadecimal notation and "65" in decimal. The data character "A" has a symbol code of "10" in the bar code standard Code 93. The symbol code 10 in Code 93 corresponds to a symbol character having a pattern of a two module width bar followed by: a single module width space, a single module width bar, a single module width space, a single module width bar, and a three module width space. The counts associated with the printing of this symbol are generally unique to each printer, and for a thermal printer, would represent the time intervals between transitions between bars and spaces to appropriately activate the printer's heating element as the thermal sensitive paper moved past it where the bars are positioned perpendicular to the direction of the label through the printer. Alternatively, the counts can indicate which dots or thermal-print elements to activate when the bars are parallel with the direction of the label through the printer.

A new bar code symbology under the present invention, dubbed "Han Ma," is created to uniquely represent each 16-bit code in any 16-bit character code by a symbol character. The symbology of the present invention must have at least 65,536 symbol characters to represent the 16-bit character codes in, for example, the Unicode Standard. In order to have at least 65,536 symbol characters to represent the 16-bit character codes, symbol character sets having 20–22 modules are available. Table 1 below shows the total number of characters available for symbologies having a reasonable range of k (i.e., the number of bars/spaces in each symbol character).

TABLE 1

The total number of possible characters for n, k sets with n = 20 to 22 and k = 4 to 8.

| n (total number of modules per symbol character) | k (number of bars/spaces per symbol character) | | | | |
|---|---|---|---|---|---|
| | 4 | 5 | 6 | 7 | 8 |
| 20 | 50,388 | 92,378 | 75,582 | 27,132 | 3,876 |
| 21 | 77,520 | 167,960 | 167,960 | 77,520 | 15,504 |
| 22 | 116,280 | 293,930 | 352,716 | 203,490 | 54,264 |

As can be seen from Table 1, the sets employing 20 modules and 5 and 6 bars (and spaces) per symbol character can represent up to 92,378 data characters and 75,582 characters, respectively. These "20's sets" are sufficient to represent the 65,536 16-bit codes in the Unicode data character encoding standard. However, the sets having 21 modules are preferred because the greater number of symbol characters (up to 167,960) allows for improved data security, error correction, and other benefits described below.

Such a large set allows for the use of parity codes. As is known by those skilled in the art, the Hamming distance between symbol characters can be maximized by eliminating all symbol characters having a Hamming distance of one and using only those symbol characters in the symbology which remain. The symbology of the present invention employs parity in its symbol character set by providing, for example, the sum of the modules of all bars in each symbol character being equal to an even number.

Without parity, a second error detection or check character is required to offset the corresponding decrease in read security. As a result, a message or string of over 20 data characters encoded under a non-parity symbology is required to break even with the same message encoded under a symbology having parity with only one check character because the symbology only saves one module/symbol character. Consequently, the symbology of the present invention provides improved information density by employing parity, especially for shorter strings of data characters.

Additionally, parity allows error correction with one symbol character by providing knowledge of the location of the error in a string of symbol characters. For example, if one symbol character in a label has an odd parity, a reader recognizes that that character is erroneous. The single error correction character (discussed below) can then correct for and replace the erroneous symbol character. Since the present invention employs parity, only those sets in Table 1 with a number of symbol characters greater than 131,072 (2×65,536) are available. The (21,5) and (21,6) sets qualify, as do all three of the n=22 sets and sets with n>22. However, to provide symbol characters as short as possible (to increase information density), the present symbology employs the n=21 set. Of the two n=21 sets, the (21,5) set has more symbol characters with undesirably large elements (discussed below). Thus, the present invention's use of the (21,6) set is preferred.

Of the 167,690 symbol characters available from the (21,6) set, approximately half are unused in the present symbology because of the parity requirement. Additionally, all symbol characters having greater than six modules are preferably omitted. A maximum of six module width element is preferred because the print head on a thermal printer may become too hot when printing bars greater than six modules in width. Also, spaces greater than six modules may be interpreted by readers as the end of a symbol or label (i.e., as the quiet zone). Furthermore, by eliminating the very wide elements, the present symbology can be readily decoded using wand-based bar code readers without significant acceleration distortions. If all symbol characters having elements greater than six modules are eliminated, 81,796 data characters may be represented. This number of data characters is greater than the number of data characters represented by Unicode.

To facilitate out-of-focus decoding to the greatest degree, it is further desirable to limit the occurrence of long strings of single width elements. As explained in the inventor's U.S. Pat. Nos. 5,389,770, entitled "Method and Apparatus for Decoding Unresolved Bar Code Profiles"; 5,486,689, entitled "Method and Apparatus for Decoding Unresolved Multi-Width Bar Code Symbology Profiles"; and 5,514,858, entitled "Method and Apparatus for Decoding Unresolved Complex Multi-Width Bar Code Symbology Profiles," out-of-focus symbol profiles can be decoded by determining the number of one-wide elements that are "lost" between resolved wide elements. If a number of one-wide elements exceeds, for example, 12, then difficulties increase under the decoding techniques described in these patents. Similarly, strings of more than 12 one-wide elements can be difficult to decode (e.g., using wand readers), and have the same reading tolerance of greater than six-wide elements.

Therefore, the symbology of the present invention eliminates all symbol characters having greater than six adjacent one-wide elements at either end of a symbol character. As a result, the longest string of one-wide elements in any label is 12 (for two adjacent symbol characters, one ending in six one-wide elements, while the other begins with six one-wide elements). Consequently, a total of 80,130 symbol characters are available under the (21,6) set after all symbol characters having greater than six one-wide elements at either end of a symbol character are eliminated.

The symbology of the present invention preferably employs the largest prime number of symbol characters in the (21,6) set, while still having the features described above. By employing a prime number of symbol characters, the present symbology has strongest checking and facilitates error correction. Because of the design of the start characters (described below), the total 80,130 symbol characters is reduced by 48 characters, yielding 80,082 usable symbol characters. The highest prime number less than 80,082 is 80,077, which is the total number of symbol characters under the present symbology.

Subtracting the 65,536 Unicode data characters from 80,077 symbol characters, provides 14,594 additional symbol characters. The symbology of the present invention preferably employs 11,000 of such remaining symbol characters to encode high density numeric values, and the balance for encoding double density alphanumeric characters. Any remaining characters are then used for multiple start characters and special characters, as described below.

The start character is selected to be unique from other symbologies, to hereby avoid autodiscrimination errors. Additionally, the start character is selected to be a subset of a symbol character, whereby the initial part of each symbol character is the same, but its final part varies. This allows data and/or other functionality to be carried in the start character, in addition to identifying the present symbology from other symbologies, and determining a direction of a scan.

A suitable start character occurs at the end of the symbol characters generated under the below routine for the (21,6) set. Ideally, the start character should be able to contain any symbol character from the entire double alphanumeric set (described below). The last characters generated below in the (21,6) set begin with 64 . . . (a six module wide bar, followed by a four module wide space). Only three of such symbol characters exist in the (21,6) set. Symbol characters beginning with 63 . . . result in only 21 characters, those beginning with 622 . . . result in 24 symbol characters, and those beginning with 621 . . . result in 76 symbol characters. Therefore, the present symbology employs start characters, all of which begin with the sequence 621 . . . (a six-wide bar, followed by a two-wide space, followed by a one-wide bar). The other symbol characters (those beginning with 64 . . . , 63 . . . , and 62 . . . ) are discarded so that the start characters are the last symbol characters in the present symbology. By providing the start characters as being the last symbol characters in the symbology, the present symbology can be more quickly decoded and processed since the reader can ignore all high value symbol characters (symbol characters having symbol codes greater than 80,007) after locating and decoding the start character.

The stop character of the present symbology is as short as possible to increase information density. At the same time, the stop character distinguishes itself from other known stop characters, and other symbol characters in the symbology. Therefore, the symbology of the present invention employs a stop character having a single three-module wide bar. By being only three modules wide, while the first bar in any label is six modules wide, the stop character is exactly one-half the size of the first bar in the start character. This allows a reader to readily find a label encoded under the present symbology: if the first bar is approximately twice the size of the last bar, then a label encoded under the present symbology has been likely located by the reader. Additionally, the reader can readily determine the X-dimension of the symbol from the known widths of the first and last bars in any label. Furthermore, a reader can determine acceleration distortions by measuring the changes in width between the first and last bars. Moreover, the reader can compare a ratio of the width of the start or stop bar to the adjacent symbol character to confirm that the ratio is 2/7 or 1/7, respectively. This provides a good check for the reader that the label currently being read is a label encoded under the present symbology.

Since 65,536 of the symbol characters are employed to encode the Unicode character codes, and 11,000 are employed to encode high density numerics, 3,470 symbol characters remain. The remaining symbol characters are employed for double density alphanumeric characters to further improve the information density of the present symbology. By encoding double density alphanumerics, a single symbol character can represent two alphanumeric characters (the alphabetic data characters A–Z, the numeric data characters 0–9, and other data characters). Since $59^2$ is 3,481, and $58^2$ is 3,364, the present symbology can encode 58 double density characters in the remaining 3,470 symbol characters. Subsequently remaining symbol characters are used for special purposes, such as flagging a non-default character set, as described herein. In general, the following Table 2 describes the allocation of all 80,077 symbol characters under the present symbology.

TABLE 2

Usage of the 80077 Symbol Characters
Under the Present Symbology

| Quantity of Symbol Characters | Allocated Use Under Symbology (Data Character Set) |
|---|---|
| 65536 | 16-bit Character Set (such as Unicode) |
| 10000 | Four Digit Numeric Compression Characters |
| 1000 | Three Digit Numeric Compression Characters |
| 3364 | Two Character Alpha-Numeric Compression (58 Character Set) |
| 106 | Special Multi-Function Characters |
| 71 | Start Characters |

The following exemplary computer software program "HanCode9", written in the known BASIC programming language, generates the complete symbol character set of the present symbology pursuant to the designs and inventive aspects specified herein.

```
HANCODE9.BAS Basic Software Program
Algorithmically generates the Han Ma character set.
REM hancode9 6 ele wid 23 April 96
DEFINT A–M, O–Z
o = 5: p = 5: q = 1: r = 1: s = 1: t = 1: u = 1: v = 2: w = 1: x = 1: y = 1: z = 1
'string of elements (symbol character) to be decoded
n = 0
FOR a = 1 TO 6 'runs each bar and space pattern for 1 to 6
  FOR b = 1 TO 6
    FOR c = 1 TO 6
      FOR d = 1 TO 6
        FOR e = 1 TO 6
          FOR f = 1 TO 6
            FOR g = 1 TO 6
              FOR h = 1 TO 6
                FOR i = 1 TO 6
                  FOR j = 1 TO 6
                    FOR k = 1 TO 6
                      FOR l = 1 TO 6
100 IF a + b + c + d + e + f + g + h + i + j + k + 1 > 21 THEN 'main filter to define
(21.6) set if sum of elements is >21, eliminate as a symbol character
IF 1 > 1 THEN
  IF k < 6 THEN k = k + 1: l = 1: GOTO 100
END IF
IF k > 1 THEN
  IF j < 6 THEN j = j + 1: k = 1: l = 1: GOTO 100
END IF
IF j > 1 THEN
  IF i < 6 THEN i = i + 1: j = 1: k = 1: l = 1: GOTO 100
END IF
IF i > 1 THEN
  IF h < 6 THEN h = h + 1: i = 1: j = 1: k = 1: 1 = 1: GOTO 100
END IF
IF h > 1 THEN
  IF g < 6 THEN g = g + 1: h = 1: i = 1: j = 1: k = 1: l = 1: GOTO 100
END IF
IF g > 1 THEN
  IF f < 6 THEN f = f + 1: g = 1: h = 1: i = 1: j = 1: k = 1: l = 1: GOTO 100
END IF
IF f > 1 THEN
  IF e < 6 THEN e = e + 1: f = 1: g = 1: h = 1: i = 1: j = 1: k = 1: l = 1: GOTO 100
END IF
IF e > 1 THEN
  IF d < 6 THEN d = d + 1: e = 1: f = 1: g = 1: h = 1: i = 1: j = 1: k = 1: l = 1:
GOTO 100
END IF
IF d > 1 THEN
  IFc < 6 THEN c = c + 1: d = 1: e = 1: f = 1: g = 1: h = 1: 1 = 1: j = 1: k = 1: l =
1: GOTO 100 END IF
IF c > 1 THEN
  IFb < 6 THEN b = b + 1: c = 1: d = 1: e = 1: f = 1: g = 1: h = 1: i = 1: j = 1: k = 1: l =
1: GOTO 100 END IF
IF b > 1 THEN
  IF a < 6 THEN a = a + 1: b = 1: c = 1: d = 1: e = 1: f = 1: g = 1: h = 1: i = 1: j = 1:
k = 1: l = 1: GOTO 100 END IF
END IF
IF a + b + c + d + e + f + g + h + i + j + k + l = 21 THEN 'begin to define symbology
```

-continued

```
where sum of element widths equals 21
  m = a + c + e + g + i + k 'define sum of bars in each symbol character
  IF INT(m / 2) = m /2 THEN 'accept only even parity
  IF a + b + c + d + e + f > 6 THEN 'ignore symbol characters have >6 1~wide elements at
the beginning
      IF g + h + i + j + k + l > 6 THEN 'ignore symbol . . . at the end
        n = n + 1 'counts a valid character
  IF n = 74544 THEN PRINT n. a; b; c; d; e; f; g; h; i; j; k; l 'prints a valid character
pattern
      END IF
    END IF
  END IF
END IF
GOTO 300 'if do not wish to decode
IF a = o THEN 'decode text to confirm that symbol character matches above criteria
  IF b = p THEN
    IF c = q THEN
      IF d = r THEN
        IF e = s THEN
          IF f = t THEN
            IF g = u THEN
              IF h = v THEN
                IF i = w THEN
                  IF j = x THEN
                    IF k = y THEN
                      IF l = z THEN
                        BEEP
                        PRINT "Decode is "; n; "."
                        END
                      END IF
                    END IF
                  END IF
                END IF
              END IF
            END IF
          END IF
        END IF
      END IF
    END IF
  END IF
END IF
300             NEXT l 'determine next symbol character
          NEXT k
        NEXT j
      NEXT i
    NEXT h
  NEXT g
  NEXT f
  NEXT e
  NEXT d
 NEXT c
 NEXT b
NEXT a
```

The above routine HanCode9 generates an initial symbol character of 111112111155, where the first number indicates the number of modules in the first bar, the second number indicates the number of modules in the first space, and so forth. This symbol character is preferably assigned to the first four digit numeric compression character. The last character in each of the above allocated sets of data characters is designated in Table 3 below.

TABLE 3

Assignment of the 80077 Symbol Characters
Under the Present Symbology

| Quantity of Symbol Characters | Symbol Code Range | Data Character Set | Last Symbol Character in Set |
|---|---|---|---|
| 11000 | 1–11000 | digits | 112111322313 |
| 3364 | 11001–14364 | double alpha-num. | 112213321221 |
| 65536 | 14365–79900 | 16-bit characters | 611312211111 |

TABLE 3-continued

Assignment of the 80077 Symbol Characters
Under the Present Symbology

| Quantity of Symbol Characters | Symbol Code Range | Data Character Set | Last Symbol Character in Set |
|---|---|---|---|
| 106 | 79901–80006 | reserved | 614111121111 |
| 71 | 80007–80077 | start characters | 621221111112 |

The assignment of symbol characters under Table 3 is arbitrary, and is made simply for exemplary purposes herein. The four digit numeric compression character set is followed by the three digit numeric compression set. Both numeric compression sets provide a high density means of encoding long strings of digits. The 58 two character alphanumeric compression set follows the same first 58 characters in the Code 128 Standard, for example. The 16-bit character codes are from the Unicode set. The 71 start symbol characters preferably first consist of the 58 alphanumeric data characters. The following start symbol characters are as follows: a pad data character, a Function 1 data character, a Function 1 data character followed by numeric values 0–9, and finally a MH10.8.3 header/trailer. The pad data character is essentially a null data character. The Function 1 pad data character, and the ten Function 1 0–9 data characters, can each be used to provide special industry-related functions. Alternatively, start characters and reserved characters can be used as shift or latch characters, or shift into and mimic functions employed by other symbology standards, such as the Code 128 standard or to define another character set. The MH10.8.3 header/trailer is an ANSI 2D symbology standard that expands to fill header and trailers and follows a standard format, known to those skilled in the art.

Since the present symbology employs a prime number of symbol characters, the present invention can employ a robust error detection scheme in addition to self-checking properties of the parity of the symbol characters. The error detection scheme of the present invention involves multiplying the symbol code of the symbol character next to the check character by one, multiplying the symbol code of the next symbol character by two, and continuing leftward under this pattern. In general, a check character $e_1$ of any string of symbol characters or label is determined based on the following equation:

$$e_1 = (S_n * n) + (S_{n-1} * (n-1)) + (S_{n-2} * (n-2)) \ldots \quad (1)$$

where S is the symbol code of each symbol character, $S_n$ is the symbol code of the first (leftmost) symbol character, and where n is the number of symbol characters in a given label. The start characters can be used as error detection characters under the present symbology, and any of such encoded label will still be readily locatable and decodable by a reader. The start characters are error-detected and -corrected under the present symbology. This is particularly beneficial since the start characters contain data characters. Error correction/detection calculation under equation (1) requires that the symbol codes begin with a zero value. Under the exemplary embodiment of the present symbology, the symbol codes begin with a value of 1. Therefore, the symbol codes S in equation (1) should in fact be one less than the symbol codes under the exemplary embodiment.

An exemplary computer software program presented below, written in the conventional BASIC programming language, calculates the error detection and correction character $e_1$.

```
HANECC.BAS Basic Software Program
Calculates the error detection and correction characters for Han Ma symbology.
REM hanecc.bas Han Code ECC calculation, modulo 80077 10july96 by sackley
DEFLNG C, E, N
PRINT "Define character values. Enter (-1) when done": PRINT
INPUT "Start Character ? ", c1
INPUT "Next Character ? ", c2
INPUT "Next Character ? ", c3: IF c3 < 0 THEN n = 2: GOTO 1900
INPUT "Next Character ? ", c4: IF c4 < 0 THEN n = 3: GOTO 1800
INPUT "Next Character ? ", c5: IF c5 < 0 THEN n = 4: GOTO 1700
INPUT "Next Character ? ", c6: IF c6 < 0 THEN n = 5: GOTO 1600
INPUT "Next Character ? ", c7: IF c7 < 0 THEN n = 6: GOTO 1500
INPUT "Next Character ? ", c8: IF c8 < 0 THEN n = 7: GOTO 1400
INPUT "Next Character ? ", c9: IF c9 < 0 THEN n = 8: GOTO 1300
INPUT "Next Character ? ", c10: IF c10 < 0 THEN n = 9: GOTO 1200
INPUT "Next Character ? ", c11: IF c11 < 0 THEN n = 10: GOTO 1100
INPUT "Next Character ? ", c12: IF c12 < 0 THEN n = 11: GOTO 1000
INPUT "Next Character ? ", c13: IF c13 < 0 THEN n = 12: GOTO 900
INPUT "Next Character ? ", c14: IF c14 < 0 THEN n = 13: GOTO 800
INPUT "Next Character ? ", c15: IF c15 < 0 THEN n = 14: GOTO 700
INPUT "Next Character ? ", c16: IF c16 < 0 THEN n = 15: GOTO 600
600 e1 = (e1 + c15 * (n - 14)) MOD 80077
700 e1 = (e1 + c14 * (n - 13)) MOD 80077
800 e1 = (e1 + c13 * (n - 12)) MOD 80077
900 e1 = (e1 + c12 * (n - 11)) MOD 80077
1000 e1 = (e1 + c11 * (n - 10)) MOD 80077
1100 e1 = (e1 + c10 * (n - 9)) MOD 80077
1200 e1 = (e1 + c9 * (n - 8)) MOD 80077
1300 e1 = (e1 + c8 * (n - 7)) MOD 80077
1400 e1 = (e1 + c7 * (n - 6)) MOD 80077
1500 e1 = (e1 + c6 * (n - 5)) MOD 80077
1600 e1 = (e1 + c5 * (n - 4)) MOD 80077
1700 e1 = (e1 + c4 * (n - 3)) MOD 80077
1800 e1 = (e1 + c3 * (n - 2)) MOD 80077
1900 e1 = (e1 + c1 * n + c2 * (n - 1)) MOD 80077
PRINT "The ECC character is "; e1
```

Another character can be added to a label to facilitate either extremely high data security, or error correction of a single symbol character. The present symbology is therefore an error correcting linear bar code symbology. The weighting scheme is the same as that for the error detecting character, in that it employs the same equation (1) above. The method simply employs a single solution of a linear equation to determine the correct value of a single symbol character error, providing its location is known by an incorrect character parity.

FIG. 1 shows a symbol character printing apparatus 100 of the present invention. The apparatus consists of a printer 102, a central processing unit (CPU) 104, a memory 106, a keyboard 107 and a secondary storage 108. The printer 102 is of a type generally known which can print bar codes and human readable data characters. Those skilled in the art may select from any such printers which are suitable for use in the present invention. The CPU 104 is electrically coupled to a host computer 105, or other apparatus or applications, by a port or line 109. The CPU 104, executing a routine (FIG. 2) stored in the memory 106 and/or the secondary storage 108, converts a 16-bit data character code into counts which are sent to the printer 102. The printer 102 interprets these counts and converts them into printed symbol characters, typically in the form of a bar code label. A "label" generally refers to any paper, cloth, plastic, metal or other pliable or rigid material suitable for having one or more symbol characters and/or data characters printed or formed thereon. Those skilled in the relevant art, however, will recognize that the term "label" also refers to any symbol characters printed on an object, such as packaging for a consumer product.

Figure 3:
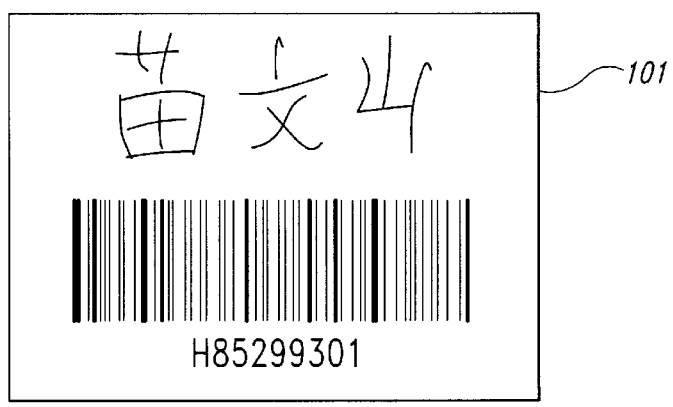
FIG. 3 is an example of a label having bar code symbol characters, with human readable characters, printed or read under the present invention.

The printed label can include both symbol characters and the corresponding human readable data characters. An example of a label 101 printed or read under the present invention is shown in FIG. 3. In the preferred embodiment, a standard 16-bit data character encoding standard is used by the present invention, for example, Unicode, JISC-6226-1983, Big Five (BF), or KSC 5609-1987. The JISC-6226-1983 standard is the Japan Industrial Standard Character set, mapping the kanji and katakana data characters into 16-bit codes. This data character standard is similar to Unicode, which, as noted above, includes the kanji and katakana data characters, among others. However, each data character in the JISC-6226-1983 standard is assigned a different 16-bit code for the equivalent data character in the Unicode standard.

Figure 2:
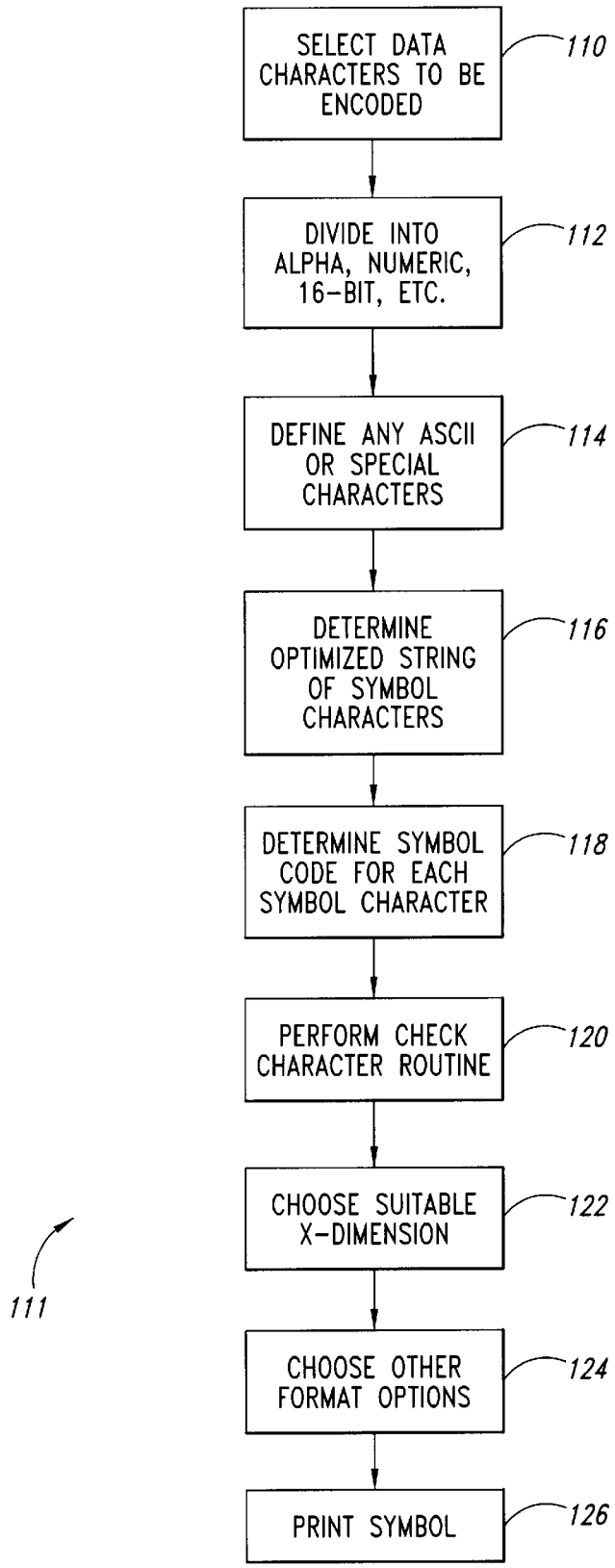
FIG. 2 is a flow chart showing the basic steps performed by the printing apparatus of FIG. 1 for printing bar code symbols each uniquely representing a 16-bit character code.

FIG. 2 shows the steps performed by the printing apparatus 100 of FIG. 1 for printing a bar code label having multiple symbol characters and with corresponding data characters. In step 110, a string of data characters are selected, input or determined, for example, such as input using the keyboard 107. The string of data characters may also be input to the CPU 104 over the line 109 from the host computer 105. When a key is depressed on the keyboard 107, the keystroke is converted into a "scan code" which is transmitted from the keyboard to the device to which the keyboard is connected (e.g., the printing apparatus 100 or the host computer 105). This scan code represents the particular key of the keyboard which has been depressed, and is unrelated to any particular character or code in a data character set, such as ASCII or Unicode.

In step 112, the CPU 104 divides or parses the selected characters into various sets of data characters, such as alpha characters, numeric characters, 16-bit characters, etc. Data parsing techniques are well known in the relevant art. In step 114, the CPU 104 defines any special characters, such as function characters (which could be encoded as start characters or special characters). In step 116, the CPU 104 determines an optimized string of symbol characters based on the selected data characters. For example, if more than two consecutive data characters are numeric, then the CPU 104 determines that the numeric compression characters should be employed to reduce the number of symbol characters and thereby increase information density of the resulting label.

In step 118, the CPU 104 determines the symbol code for each data character. A table of data characters and their corresponding symbol codes is preferably stored in the secondary storage 108, along with the counts for the corresponding symbol characters. Alternatively, the symbol codes can be automatically calculated from knowledge of the data characters (as noted above with respect to the HanCode9 routine). In step 120, the CPU 104 generates the check character by employing the above-described check character routine of equation (1). In step 122, the CPU 104 chooses a suitable X-dimension for the symbol based on, in part, the number of symbol characters to be printed. In step 124, the CPU 104 chooses other format options, such as printing the symbol with the human readable data characters, or other format options known by those skilled in the relevant art. In step 126, the CPU 104 outputs the appropriate codes and other signals to the printer 102, which in turn prints the symbol as a series of symbol characters (and possibly data characters) to form the bar code label.

Figure 4:
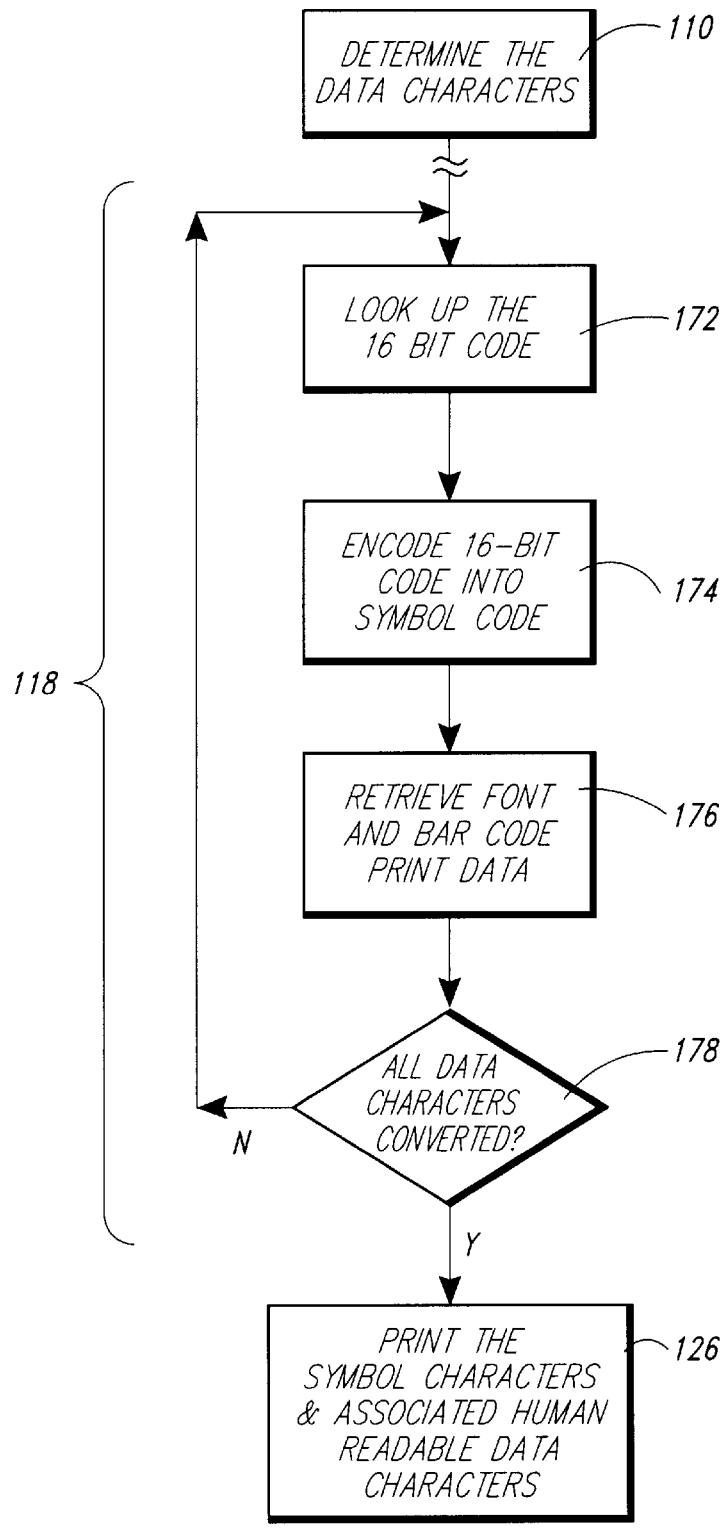
FIG. 4 is a flowchart showing several steps performed under a step of the flowchart of FIG. 2.

Referring to FIG. 4, a flowchart showing in more detail the specific steps performed under step 118 of the routine 111 is shown. After a string of data characters has been determined in step 110, the CPU 104 in step 172 looks up any character code for the given data character. The CPU 104 converts the scan code into a corresponding ASCII code or a Unicode code (16-bit code) under such standards. The CPU 104 has a lookup table, or algorithmically generates, the 16-bit code or other code for the given data character. For example, when encoding Unicode data characters, each data character has a unique 16-bit code for each data character under the Unicode standard.

In step 174, the CPU 104 retrieves the unique symbol code in the present symbology that represents the 16-bit code from a look-up table stored in either the memory 106 or the secondary storage 108. Alternatively, the symbol codes could be algorithmically generated based on values of the data characters. For example, if a given data character has a corresponding value in the Unicode standard, its corresponding symbol code could simply be the Unicode value plus a constant.

In step 176, the CPU 104 retrieves the counts for printing the symbol characters representing each of the symbol codes. The counts for an appropriate start character and stop character are also retrieved. The memory 106 or the secondary storage 108 stores the symbol codes and corresponding counts.

In the preferred embodiment, the symbol characters can also be printed with the human readable data characters. Therefore, in step 176, the CPU 104 retrieves the data character font data necessary for printing the data characters. The font data provides the printer 102 with particular data necessary to print the unique data character represented by each symbol character. With a dot matrix-type printer (not shown), the font data instructs the printer how to print the unique data character. The font data is stored in either the memory 106 or the secondary storage 108.

In step 178, the CPU 104 determines whether all data characters in the string initially selected in step 110 have been converted. If additional data characters remain in the string, then the unique 16-bit code or other code for the next data character is found in step 172, its corresponding symbol code is retrieved in step 174, and the particular font and symbol character counts are retrieved in step 176. This process is repeated until all of the data characters have been converted. Thereafter, in step 126, the bar code is printed by the printer with both the symbol characters, and the associated human readable data characters.

Figure 5:
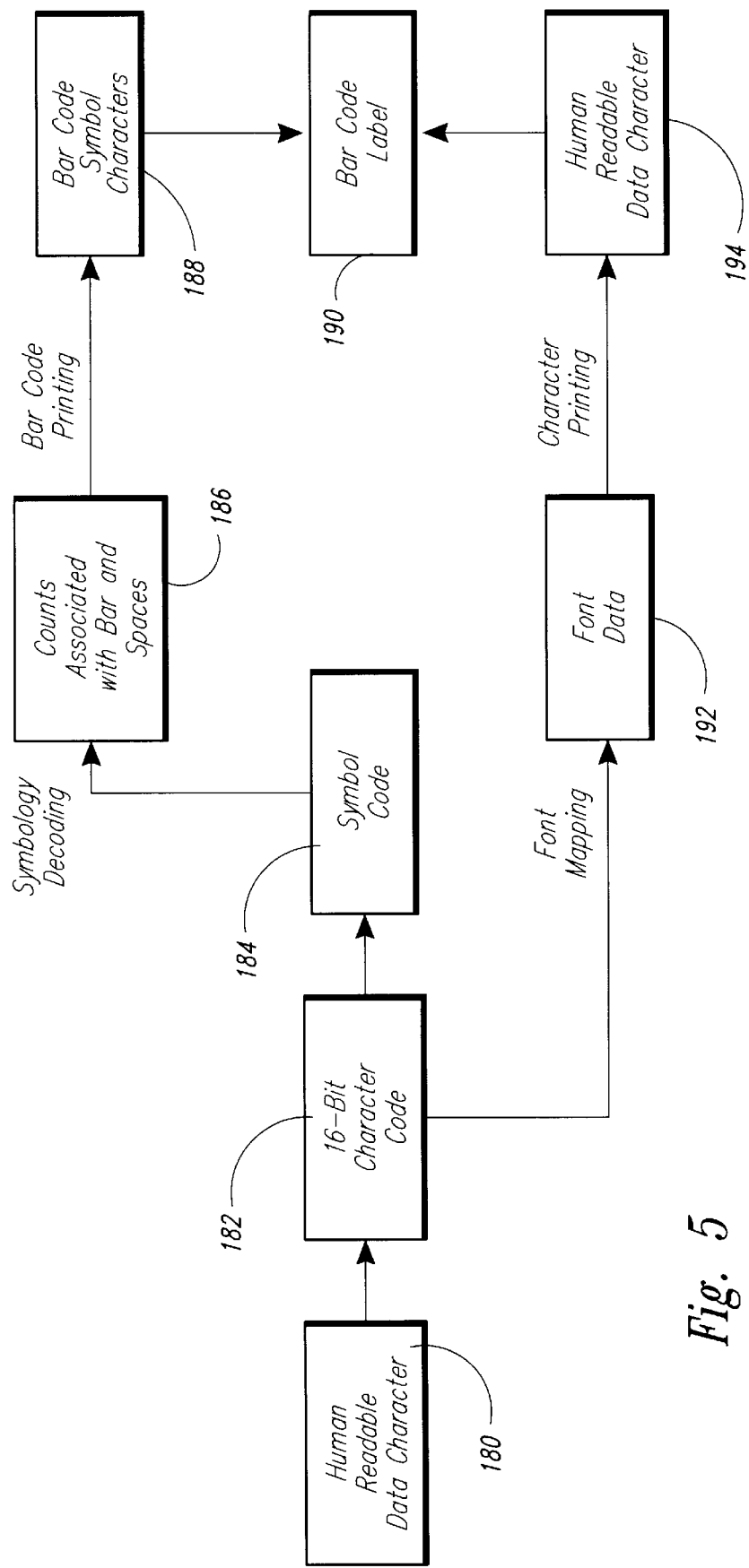
FIG. 5 is a data transformation diagram showing the transformation of data from characters to bar code symbols printed by the apparatus of FIG. 1.

FIG. 5 shows the transformation of a data character under a 16-bit code standard into a bar code label having both symbol characters and human readable data characters, by using the steps shown in FIG. 4. The transformation begins with a selected data character (block 180). The data character is converted to a 16-bit code, assigned by a 16-bit encoding standard such as Unicode (block 182). The 16-bit code for the data character is converted into a symbol code (block 184). The symbol codes are then converted into the counts representing the bars and spaces necessary for symbol character printing (block 186). The counts associated with the bar and spaces are then printed as symbol characters (block 188) to produce the bar code label (block 190).

Each corresponding human readable data character is also printed with the symbol characters. As described herein, each 16-bit code represents a unique data character. The 16-bit code is mapped onto the font data necessary for printing the unique data character (block 192). The font data is then printed as human readable data characters (block 194) to produce the bar code label (block 190). For example, if the data characters are printed on a dot matrix printer, then the font data is the appropriate signals to drive the dot matrix printer so as to print the data character. This data character is printed together with the present symbology's symbol characters (i.e., block 188) on the completed bar code label (block 190), as shown in FIG. 3. The counts and font data are stored as each data character is converted, and then the entire label is printed after all data characters have been converted. Alternatively, the symbol characters and data characters are printed sequentially as each human readable data character is transformed into printed symbol characters and data characters on the bar code label.

The above steps are performed by the printing apparatus 100 to create a label with the exemplary symbol character set created under the above BASIC routine, together with error correction and detection, as well as some alphanumeric data characters. The label 101 of FIG. 3 might be used in a human identification application. The data characters encoded in the label 101 are "H85299301 Miew Mnn Shaun" where the "name" is really three Chinese characters represented in the Unicode Character set by the 16-bit codes 33494, 25991 and 23665. The Unicode data characters are represented by symbol codes in the present symbology by 14363 plus their Unicode 16-bit codes. The first data character in the label 101 encodes an "H," which is the 40th start character. Since both the symbol codes of the present symbology as well as the Unicode character set starts with a value of one, it is ordinal, while the check characters are calculated by values starting with zero, the check character values are one less than the ordinal number. Consequently, the data to be encoded is:

TABLE 4

Check Character Value and Weight
With Respect to Symbol Code for the
Exemplary Label of FIG. 3

| symbol code | 80047 | 8530 | 9302 | 47858 | 40355 | 38029 |
|---|---|---|---|---|---|---|
| check character Value | 80046 | 8529 | 9301 | 47857 | 40354 | 28028 |
| Weight | 6 | 5 | 4 | 3 | 2 | 1 |

An error correction character for the label 101 calculated using the above weighting values is 21662. A check character is calculated using a new string of weighting values ending in 7 and is 27208. The symbol codes are then entered into the above BASIC routine to generate the following symbol characters:

TABLE 5

Symbol Codes and Corresponding Bar/Space Patterns for the Symbol
Characters in the Label of FIG. 3

| Symbol Code | bar/space pattern | | | | | | | | | | |
|---|---|---|---|---|---|---|---|---|---|---|---|
| | b | s | b | s | b | s | b | s | b | s | b | s |
| 80047 (start character) | 6 | 2 | 1 | 1 | 2 | 1 | 1 | 1 | 1 | 1 | 1 | 3 |
| 8530 | 1 | 1 | 1 | 3 | 2 | 1 | 4 | 2 | 1 | 1 | 3 | 1 |
| 9302 | 1 | 1 | 1 | 4 | 1 | 1 | 2 | 2 | 2 | 1 | 1 | 4 |
| 47858 | 2 | 1 | 1 | 2 | 2 | 3 | 3 | 2 | 1 | 3 | 1 | 1 |
| 40355 | 1 | 4 | 1 | 1 | 2 | 2 | 1 | 1 | 2 | 2 | 3 | 1 |
| 38029 | 1 | 3 | 2 | 1 | 3 | 1 | 1 | 3 | 2 | 2 | 1 | 1 |
| 21663 | 1 | 1 | 5 | 1 | 1 | 4 | 1 | 3 | 1 | 1 | 1 | 1 |
| 27208 | 1 | 2 | 1 | 3 | 1 | 1 | 2 | 2 | 2 | 4 | 1 | 1 |
| Stop | 3 | | | | | | | | | | | |

FIG. 3 shows the resultant label printed with a 10 mil X-dimension with the corresponding data characters (ie., person's identification number and name). The resulting label actually encodes both identification number and name and has error correction and powerful error detection.

Figure 6:
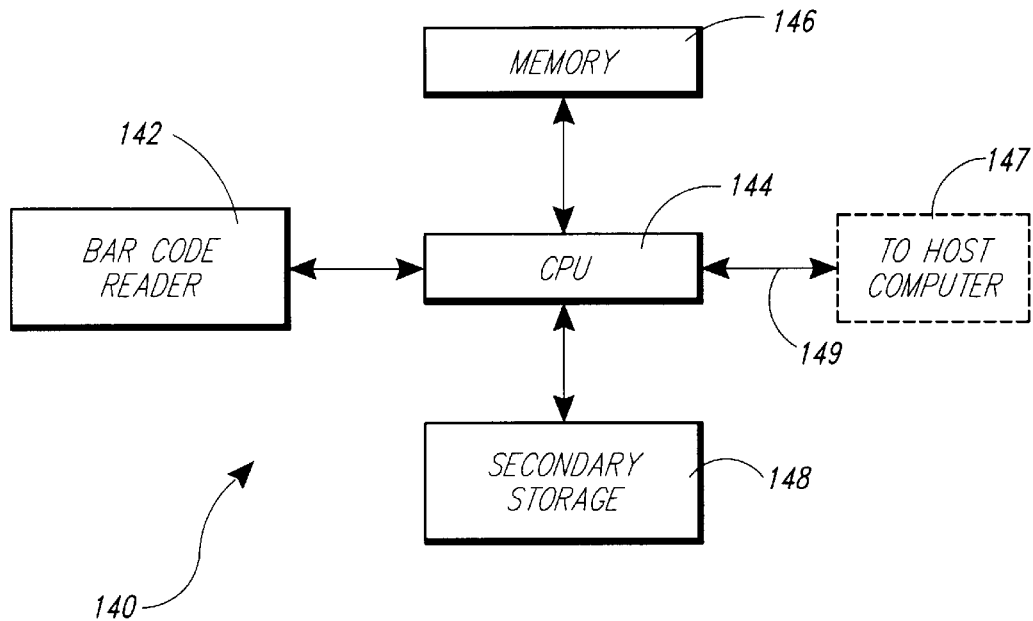
FIG. 6 is a block diagram of a bar code symbol reading apparatus of the present invention.

The symbology of the present invention can also be readily read using a bar code reading apparatus such as a bar code reading apparatus 140, shown in FIG. 6. The reading apparatus 140 has a standard bar code reader 142. The bar code reader 142 includes an electro-optical device 143 such as a laser scanner, rasterizing laser, or wand-based optical transducer. Alternatively, the electro-optical device 143 in the reader 142 can include a one- or two-dimensional CCD, semiconductor array, vidicon, or other area imager capable of converting received light into electrical signals. The electro-optical device 143 in the reader 142 can also include a light source such as an LED, flash bulb, infrared light source, or other light-emitting element. As used generally herein, the term "reader" refers to any device capable of converting modulated light received from a bar code into electrical signals. Readers are known by those skilled in the art, and any such reader suitable for use in the present invention can be selected. The data read from the bar code reader 142 is input to a CPU 144. A memory 146 and a secondary storage 148 are coupled to the CPU 144. The data input to the bar code reader 142 is processed by the CPU 144 and output to a host computer 147, or other apparatus or applications, by a port or line 149.

Figure 7:
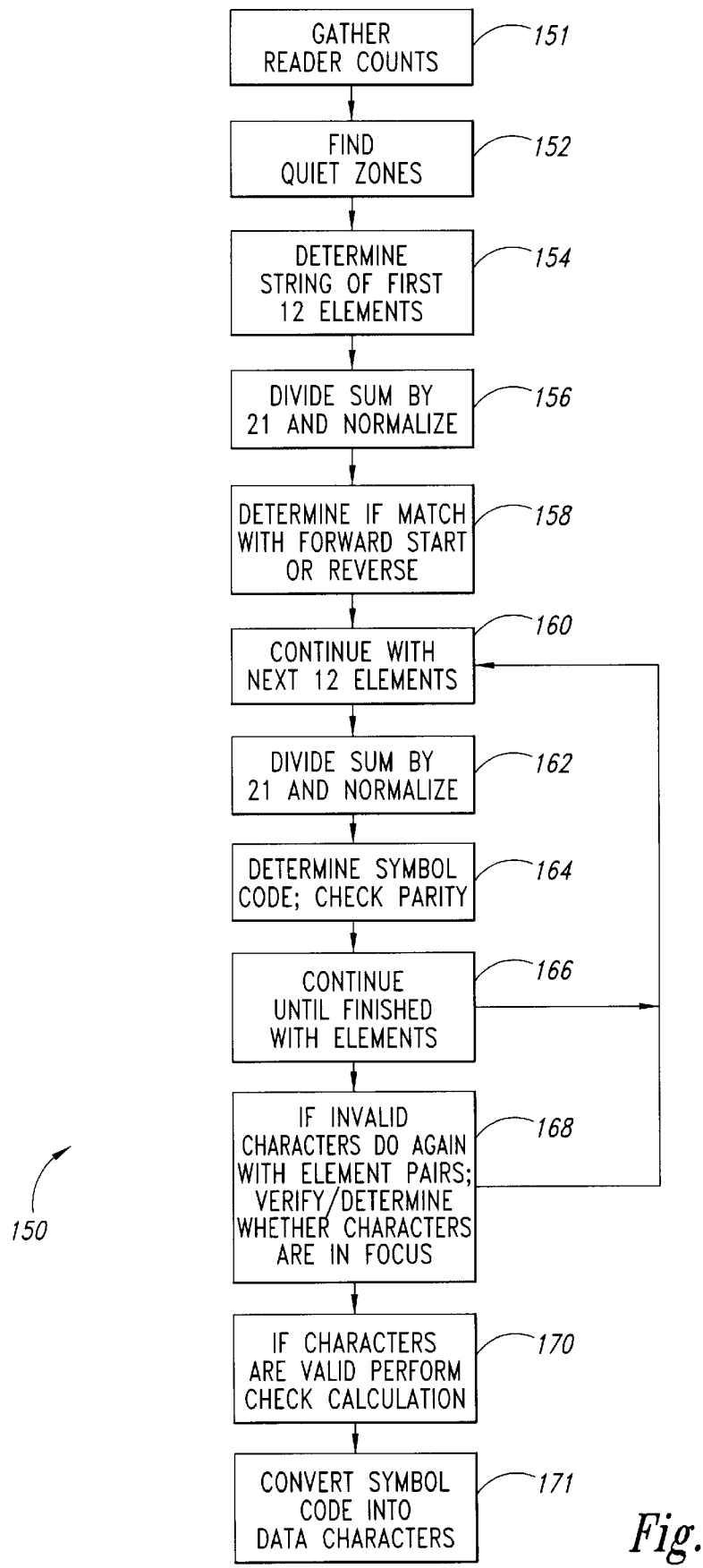
FIG. 7 is a flow chart showing the basic steps performed by the reading apparatus of FIG. 6 for reading bar code symbols representing 16-bit character codes.

FIG. 7 shows the steps performed under a routine 150 by the reading apparatus 140 of FIG. 6 for reading bar code symbols having symbol characters from the present symbology. In step 151, the bar code reader 142 scans or images the symbol characters of a bar code label and determines a series of counts. As is known by those skilled in the art, the transitions between bars in the symbol characters, together with a timer within the reading apparatus 140, determines the counts of the symbol characters read. The counts in turn are used to determine the widths of elements in a given symbol. In step 152, the CPU 144 analyzes the counts, to locate the quiet zones on both sides of the symbol.

In step 154, the CPU 144 selects the first 12 sets of counts, which represent the first string of 12 element widths. In step 156, the CPU 144 divides the first twelve sets of counts by 21 and normalizes the result to estimate the widths of the individual elements. In step 158, the CPU 144 compares the widths of the first 12 elements to the string of widths for one of the start characters and with the reverse string of widths for the stop character. If the last 12 elements in the string correspond to the 12 elements from one of the start characters, but in reverse, the CPU 144 recognizes that the symbol has been scanned in reverse, and therefore recognizes that the symbol is to be read from right to left (as opposed to the traditional left to right). In step 158, the CPU 144 also determines which of the several start characters has been located to determine the data character, the function character, or pad character encoded in the start character.

In step 160, the CPU 144 selects the next 12 elements, and in step 162, divides the sum of the elements (counts) by 21 and normalizes the result. In step 164, the CPU 144 determines the symbol code for the selected 12 elements. In step 164, the CPU 144 also checks the parity of the selected 12 elements. If the sum of the bars is equal to an even number, then the parity checks. In step 166, the CPU 144 determines if the label contains any additional elements and if so, loops back to step 160 to perform the steps 160 through 164 again until all of the symbol characters have been converted into symbol codes.

In step 168, the CPU 144 determines if any invalid/undecodable symbol characters have been generated. If some symbol characters are determined to be undecodable, then the routine loops back to step 160 and the CPU 144 performs other known decode methods, such as edge-to-edge (element pairs) decoding for individual elements in the symbol. Alternatively, in step 168, the CPU 144 performs bar-to-bar or space-to-space comparisons, or Factor R decoding methods, known to those skilled in the art.

In step 168, the CPU 144 can also verify or determine whether the symbol characters are in focus. The CPU 144 analyzes the signals produced by the bar code reader 142 for the symbol characters to determine whether the CPU can recognize the wide elements but fail to recognize the one-wide elements. If the CPU 144 cannot recognize the one-wide elements in one or more symbol characters, the CPU aborts the decode routine, provides unfocused data to the CPU, or performs other functions such as alerting the user that the symbol is not in focus. If the CPU 144 is sufficiently programmed, it can decode the unfocused data based on the above-noted patents by the present inventor.

If the symbol is in focus or if the CPU 144 decodes the unfocused data, so that all of the symbol codes are valid (ie., map to data characters) then in step 170, the CPU performs the check calculation based on the last symbol character. The CPU 144 applies all of the symbol codes to the check character computation method described above to determine if the result equals the symbol code of the check character. If not, then the CPU 144 performs error correction. Alternatively, the CPU 144 can perform error correction under step 164 when parity is checked. If so, then in step 171, the CPU 144 converts the symbol codes into data characters based on a lookup table by retrieving the appropriate data characters from the memory 146 or the secondary storage 148 depending upon where the appropriate data is stored. The data characters can then be displayed, or used in other applications by the CPU 144, or output over the line 149 to the host computer 147. Alternatively, the CPU 144 can simply output the symbol codes over the line 149 to the host computer 147, which in turn performs the conversion into the corresponding data characters.

Figure 8:
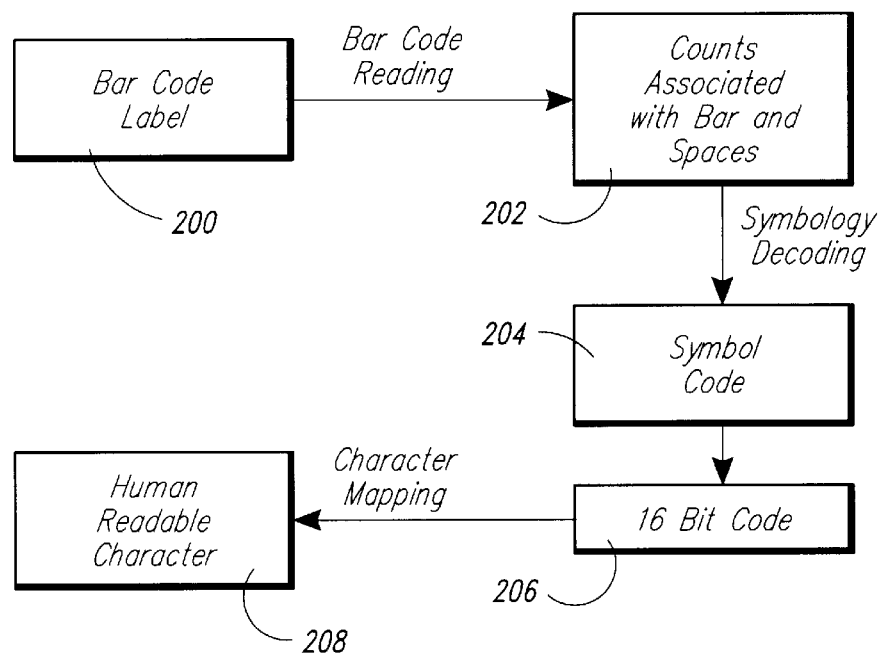
FIG. 8 is a data transformation diagram showing the transformation of data from bar code symbols read by the apparatus of FIG. 5 into characters.

FIG. 8 shows the transformation of a bar code label into a data character or string of data characters, by using the steps shown in FIG. 7. The transformation begins with a bar code label having several symbol characters (block 200), such as the label 101. The label 101 is read and the counts associated with the bars and spaces of this label are determined by the bar code reader 142 and the CPU 144 (block 202). The counts are converted into symbol codes (block 204). Each symbol code is then converted into, e.g., a 16-bit code, numeric string, etc. (block 206). The 16-bit code is mapped to its corresponding unique human readable data character (block 208). The data character is then output by the CPU 144 for use in any appropriate application (e.g., displayed on a computer screen).

Figure 9:
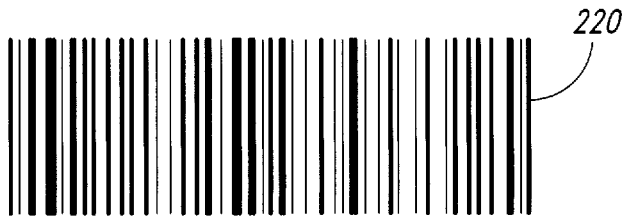
FIG. 9 shows exemplary labels under the Code 128 standard and the present symbology, both of which encode the string of data characters 00000521775138957172.
Figure 9:
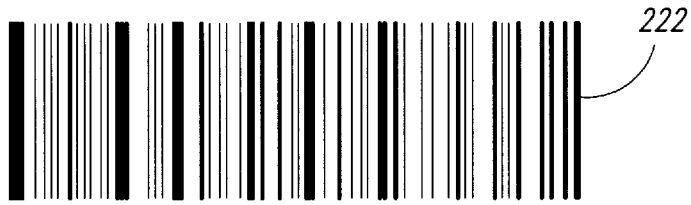
Figure 10:
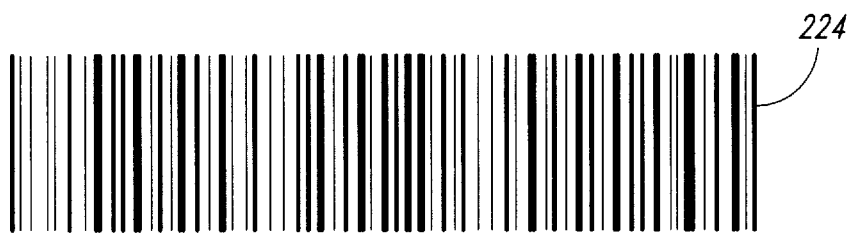
FIG. 10 shows exemplary labels under the Code 128 standard and the present symbology, both of which encode the string of data characters A1234BC5678DE9012.
Figure 10:
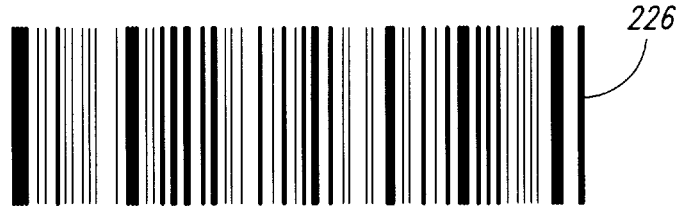

Referring to FIGS. 9 and 10, the present symbology not only provides the above-described benefits, but also provides improved information density or efficiency. Both the labels of FIG. 9, and the labels of FIG. 10, are printed at an X-dimension of 0.20 inch. By providing three- and four-digit compressed numeric data character sets, the efficiency of the present symbology is maximized at multiples of four-digit data characters whereby the density is even better than Code 128. Code 128 has a density of 5.5 modules per digit, while the present symbology can encode 5.25 modules per digit. At less maximized efficiencies, for other strings of data characters, the density of the present symbology may be slightly less than that of Code 128. The following Table 4 summarizes the numeric symbol character density for the present symbology (Han Ma) as compared to Code 128, which is the current highest density linear symbology for long numeric digit strings. The following table assumes the use of the appropriate start character for the symbologies in both cases.

TABLE 6

Comparison of Efficiency in Encoding
Strings of Digits Between Code 128
and Present Symbology

| Quantity of Digits | 1 | 2 | 3 | 4 | 5 | 6 | 7 | 8 | 9 | 10 | 11 |
|---|---|---|---|---|---|---|---|---|---|---|---|
| Han Ma | 0 | 10.5 | 7 | 5.25 | 5.25 | 7 | 6 | 5.25 | 5.25 | 6.3 | 5.73 |
| Code 128 | 11 | 11 | 11 | 11 | 8.8 | 5.5 | 7.86 | 5.5 | 7.33 | 5.5 | 7 |

As shown in FIG. 9, both a Code 128 label 220 and a label 222 encoded under the present symbology are shown encoding a standard string of numeric digits under the UCC SSCC-18 standard (which is the numeric string 00000521775138957172). As shown, the label 222 under the present symbology is only slightly larger than the label 220 encoded under Code 128.

The double alphanumeric data character set of the present symbology provides 10.5 modules per symbol character, which is slightly better than Code 128, which provides 11 modules per symbol character, but less than Code 93 which provides 9 modules per data character. Code 128 can encode a greater size character set as compared to Code 93 which has a smaller sized data character set. Overall, the alpha and numeric density for the present symbology is comparable to some degree to the density of the known Code 128 and Code 93 standards. However, when 16-bit characters are encoded under the present symbology, Code 93 requires up to 27 modules per character, while Code 128 would require up to 33 modules per character (if it could encode 16-bit data characters within its data character set). The present symbology requires only 21 modules to encode any 16-bit character.

As shown in FIG. 10, a label 224 encoded under the Code 128 standard, and a label 226 encoded under the present symbology, encode a string of mixed alphabetic and numeric data characters of "A1234BC5678DE9012". As shown in FIG. 10, the label 226 encoded under the present symbology is substantially shorter, and therefore has a greater information density, than the label 224 encoded under the Code 128 standard.

Various alternative embodiments to the present invention are possible, as will be recognized by those skilled in the relevant art. A first alternative embodiment has a greater character set than the 80,077 symbol character set described above. As noted above, the present symbology preferably includes parity, no 7-wide (or greater) elements, and no strings of greater than 6 1-wide elements at either end of a symbol character. While the above-described symbology obtains certain advantages by placing the start characters as the last-generated symbol characters under the above software routine HanCode9, the first alternative embodiment provides additional symbol characters. Under the first alternative embodiment, the symbol character assignment is substantially identical to that of Table 3, except that all of the 621 . . . start characters are employed, so that the symbol code range extends to 80,082. The last symbol character in the set is then 621311211111, which provides a quantity of 76 of such symbol characters.

Under the first alternative embodiment, 48 more symbol characters are available. However, as noted above, the present symbology preferably employs a prime number of symbol characters. The largest prime number less than 80,130 is 80,111. As a result, the last 19 symbol characters are discarded under the first alternative embodiment. The above software routine HanCode9 can readily be adapted to generate this symbology of the first alternative embodiment. Under such an adapted software routine, the last symbol character generated by the routine would be 631111121121, which corresponds to the symbol code 80,111

Under a second alternative embodiment, a symbology is provided that permits a greater possibility of a successful decode. As noted above, one well-known method of decoding is "edge-to-edge" decoding, or alternatively, element-paired decoding. Such decoding is particularly easy to implement if a symbology has no ambiguous symbol characters. Ambiguity is substantially eliminated if every symbol character in the symbology has at least a single 1-wide bar.

The above software program HanCode9 is modified under the second alternative embodiment by replacing the instructions:

```
IF a + b + c + d + e + f + g + h + i + j + k + l = 21
  m = a + c + e + g + i + k
  IF INT(m / 2) = m /2 THEN
    IF a + b + c + d + e + f > 6
    IF g + h + i + j + k + l > 6
      n = n + 1
```

With the following instructions:

```
IF a + b + c + d + e + f + g + h + i + j + k + l = 21 THEN
  m = a + c + e + g + i + k
  IF INT(m / 2) = m /2 THEN
    IF a + b + c + d + e + f > 6 THEN
      IF g + h + i + j + k + l > 6 THEN
200     IF ((a = 1 OR c = 1) OR (e = 1 OR g = 1) OR (i = 1 OR k = 1) THEN
          n = n + 1
        IF n = 79948 THEN PRINT n, a; b; c; d; e; f; g; h; i; j; k; l
        END IF
      END IF
    END IF
  END IF
End IF
```

The logic statement, labeled 200, in the above modifications to the HanCode9 routine adds the restriction that every symbol character must have at least one 1-wide bar. As a result of this restriction, the total number of symbol characters under the second alternative embodiment is reduced to 79,948. The largest prime number less than 79,948 is 79,943. In order to have enough start characters to encode data, the number of double-compression alphanumeric symbol characters is reduced from 58 to 57, to provide a total of 3,249 of such symbol characters. The modified HanCode9 routine generates the following symbol characters, which are assigned as follows.

TABLE 7

Assignment of the 80077 Symbol Characters Under the Present Symbology

| Quantity of Symbol Characters | Symbol Code Range | Data Character Set | Last Symbol Character in Set |
|---|---|---|---|
| 11000 | 1–11000 | digits | 112111322313 |
| 3249 | 11001–14249 | double alpha-num. | 112212512211 |
| 65536 | 14250–79785 | 16-bit characters | 612211111212 |
| 39 | 79786–79824 | reserved | 614111121111 |
| 76 | 79825–79900 | start characters | 621311211111 |
| 43 | 79901–79943 | reserved | 632111111112 |

The first symbol character generated is, as with the above-described symbology, 111112111155.

A third alternative embodiment provides a new stop pattern to the above symbologies. While the single 3-wide bar disclosed above is sufficient to permit decoding of the present symbology, it requires the reading apparatus 140 to rely on the start character in a given label for all information. The third alternative embodiment expands the stop character by providing a second 3-wide bar separated from the first 3-wide bar by a 1-wide space (i.e., resulting in the pattern 313). Consequently, by simply adding four additional modules, an improved stop character is provided. The stop character of the third alternative embodiment is readily distinguishable from other symbologies, but in addition, is sufficiently distinguishable so as to unambiguously identify a reverse scan of the present symbology. Such a two-bar stop character is better suited for measuring the X-dimension of a given label, and is hence better to determine acceleration. Further, the sum of the elements in the stop character is 7, which is still an integer divisor of 21. Finally, the pattern is easily discernible in an out-of-focus reading condition.

Those skilled in the art will recognize that the above-described invention provides an efficient means for encoding data characters represented by 16-bit data character codes or numeric strings into symbol characters, and then converting those symbols back into data characters or numeric strings. The above-described system supports the emerging 16-bit data character encoding standards in the data collection markets and thus can be used in worldwide applications. Thus, the above-described symbology and systems readily permit data in computer formats to be converted to a bar code format and vice versa. The above-described symbology and systems allow long numeric and alphanumeric strings to be efficiently and compactly represented by the present symbology. The present symbology can be determined algorithmically using a simple computer program routine. The start characters of the present symbology have extended functionality and the start and stop characters are unique with respect to other symbologies. The character set of the present symbology has self-checking characters, appended to a string of symbol characters and employs a prime number of symbol characters to provide high levels of error detection, while also providing for error correction. The present symbology is wand scannable, readily printable, and can be decoded under known techniques when out-of-focus.

A portion of the disclosure provided herein contains material to which the inventor and/or the assignee (the copyright owner) claims copyright protection. The copyright owner has no objection to the facsimile reproduction by anyone of the patent document or the patent disclosure, as it appears in the Patent and Trademark Office files or records, but reserves all other copyrights whatsoever.

Although specific embodiments of, and examples for, the present invention have been described for purposes of illustration, various equivalent modifications may be made without departing from the spirit and scope of the invention. For example, if the memory 106 or 146 is sufficiently large to contain all data required by the CPU 104 or 144 for encoding, decoding, printing or reading bar code labels, the secondary storage 108 or 148 is unnecessary and thus eliminated. Alternatively, the data required by the CPU 104 or 144 may be contained in the secondary storage 108 or 148, thus eliminating the need for a large memory 106 or 146 or the need for this memory entirely. Furthermore, the printing apparatus 100 or the reading apparatus 140 may use only a limited data character set. Only the data required by the CPU 104 or 144 representing this data character subset is stored in the memory 106 or 146. The secondary storage 108 or 148 is unnecessary, and therefore be eliminated.

Regarding the symbology, the symbol characters under the (21,6) symbology can be allocated to different sets of data characters than as described above with respect to Table 3. Those skilled in the relevant art can create a (21,6) symbology that employs some or all of the criteria presented above, but not necessarily as specifically set forth in the above exemplary embodiment. Such a (21,6) symbology could assign data characters for corresponding symbol characters in a different fashion, and could even perform such an assignment pseudo-randomly. Under such a pseudorandomized assignment of data characters for symbol characters, the symbology will reduce the occurrence of similar data types matching to similar patterns of bars and spaces, so that a slight change in the width of a given element would be read as a different data character (e.g., a 16-bit character versus a compressed numeric character).

Additional error correction characters can be added to any label to further improve the ability to correct errors in the label. The Function 1 start characters, or any of the reserved symbol characters can be used to latch into a mode for encoding other sets of data characters such as other 16-bit characters. For example, where the standard symbol character set encodes the Unicode characters, a latched set can encode the JISC-6226-1983 characters. Additionally, the present invention can incorporate the teachings of the U.S. Patents and/or applications described herein to provide additional benefits and functionality. For example, the present symbology can employ a start character having one-wide elements sandwiched between two wide elements to determine if a label is out-of-focus, as taught by the inventor's U.S. patent application Ser. No. 08/433,835, filed May 4, 1995, entitled "Single Width Barcode Symbology With Full Character Set Utilizing Robust Start/Stop Characters And Error Detection Scheme." The U.S. Patents and applications cited above are incorporated herein by reference as if set forth in their entirety.

These and other changes can be made to the invention in light of the above detailed description. In general, in the following claims, the terms should not be construed to limit the invention to the specific embodiments disclosed in the specification and claims, but should be construed to include all apparatus, methods and symbologies for directly encoding at least 16-bit character codes. Accordingly, the invention is not limited by the disclosure, but instead its scope is to be determined entirely by the following claims.

I claim:

1. A method of converting a selected human readable character to machine-readable symbols, each symbol having a pattern of dark shapes and light spaces between the shapes, the selected human readable character represented by a character code having at least 16 bits, the method comprising the steps of:

selecting a single human readable character from a standard set of human readable characters, the standard set of human readable characters having more than 6,400 human readable characters in the set;

determining a character code having at least 16 bits for the selected single human readable character, the selected single human readable character and character code being selected from the standard set of human readable characters, wherein each character in the set of human readable characters has a corresponding character code;

converting the selected character code to a selected symbol code; and printing a single symbol corresponding to the selected symbol code, the symbol and the selected symbol code being selected from a (21,6) symbology wherein each symbol in the symbology has 6 bars and 6 spaces and a width of 21 modules, and wherein the set of symbols is at least equal to the set of human readable characters.

2. The method according to claim 1 wherein the steps of determining, converting and printing are repeated for each human readable character in a selected string of human readable characters.

3. The method of converting according to claim 1 wherein the step of converting includes the step of retrieving the selected symbol code from a table of stored symbol codes.

4. The method of claim 1 wherein the standard set of human readable characters is the Unicode standard, and wherein the step of determining a character code determines a 16-bit code from the Unicode standard.

5. The method of claim 1, further comprising the step of printing the selected single human readable character with the printed single symbol.

6. The method of claim 1, further comprising the steps of:

selecting three or more digits;

converting the three or more of digits to a single symbol code; and printing a single additional symbol corresponding to the single symbol code, wherein the single additional symbol and the single symbol code are selected from the (21,6) symbology.

7. The method of claim 1, further comprising the step of printing a start symbol, the start symbol being selected from a set of start symbols in the (21,6) symbology, each of the start symbols has an identical first portion, and a unique second portion with respect to each of the start symbols in the set of start symbols, and wherein the unique portion encodes at least one data character.

8. The method of claim 1 wherein each symbol in the (21,6) symbology in the step of printing is selected from the set of symbols, the set of symbols having a prime number of symbols.

9. The method of claim 1, further comprising the steps of:

computing a check value based on at least the character code; and printing a check symbol corresponding to the computed check value, the check symbol and the check value being from the (21,6) symbology.

10. The method of claim 1 wherein the step of converting includes algorithmically generating the selected symbol code based on the selected character code.

11. A method of converting data characters to machine-readable symbols, each symbol having a pattern of dark shapes and light spaces between the shapes, wherein a selected human readable character is represented by a character code having at least 16 bits, the method comprising the steps of:

determining a character code having at least 16 bits for the selected single data character, the selected data character and the selected single character code being selected from a standard set of more than 6,400 data characters, wherein each character in the set of data characters has a corresponding character code;

converting the selected single character code to a single selected symbol code; and printing a single symbol corresponding to the single selected symbol code, the single symbol and single selected symbol code being selected from a set of symbols in a symbology, wherein a number of symbols in the set of symbols in the symbology is at least equal to a number of data characters in the set of human readable characters.

12. The method according to claim 11 wherein the steps of determining, converting and printing are repeated for each data character in a selected string of data characters.

13. The method of converting according to claim 11 wherein the step of converting includes the step of retrieving the symbol code from a table of stored symbol codes.

14. The method of claim 11 wherein the standard set of data characters is the Unicode standard, and wherein the step of determining a character code determines a 16-bit code from the Unicode standard.

15. The method of claim 11, further comprising the step of printing a selected single human readable character with the printed single symbol, the human readable character corresponding to the selected single data character.

16. The method of claim 11, further comprising the steps of:

selecting a plurality of digits;

converting the plurality of digits to a single symbol code; and printing a single additional symbol corresponding to the single symbol code, wherein the single additional symbol and the single symbol code are selected from the symbology.

17. The method of claim 11, further comprising the step of printing a start symbol, the start symbol being selected from a set of start symbols in the symbology, each of the start symbols having a first portion identical to each of the start symbols in the set of start symbols, and a second portion unique to each of the start symbols in the set of start symbols, wherein the unique portion encodes at least one data character.

18. The method of claim 11 wherein each symbol in the symbology in the step of printing is selected from the set of symbols, the set of symbols having a prime number of symbols.

19. The method of claim 11, further comprising the steps of:

computing a check value based on the character code; and printing a check symbol corresponding to the computed check value, the check symbol and the check value being selected from the symbology.

20. The method of claim 11 wherein the step of printing includes algorithmically generating a selected pattern of dark shapes and light spaces between the shapes for the single symbol, based on the single selected symbol code.

* * * * *